March 23, 1954  A. W. WAY  2,672,982
SOLIDS RETENTION APPARATUS FOR STREAMS
Filed Dec. 1, 1950

INVENTOR:
Alben Warren Way
BY Paul & Paul
ATTORNEYS.

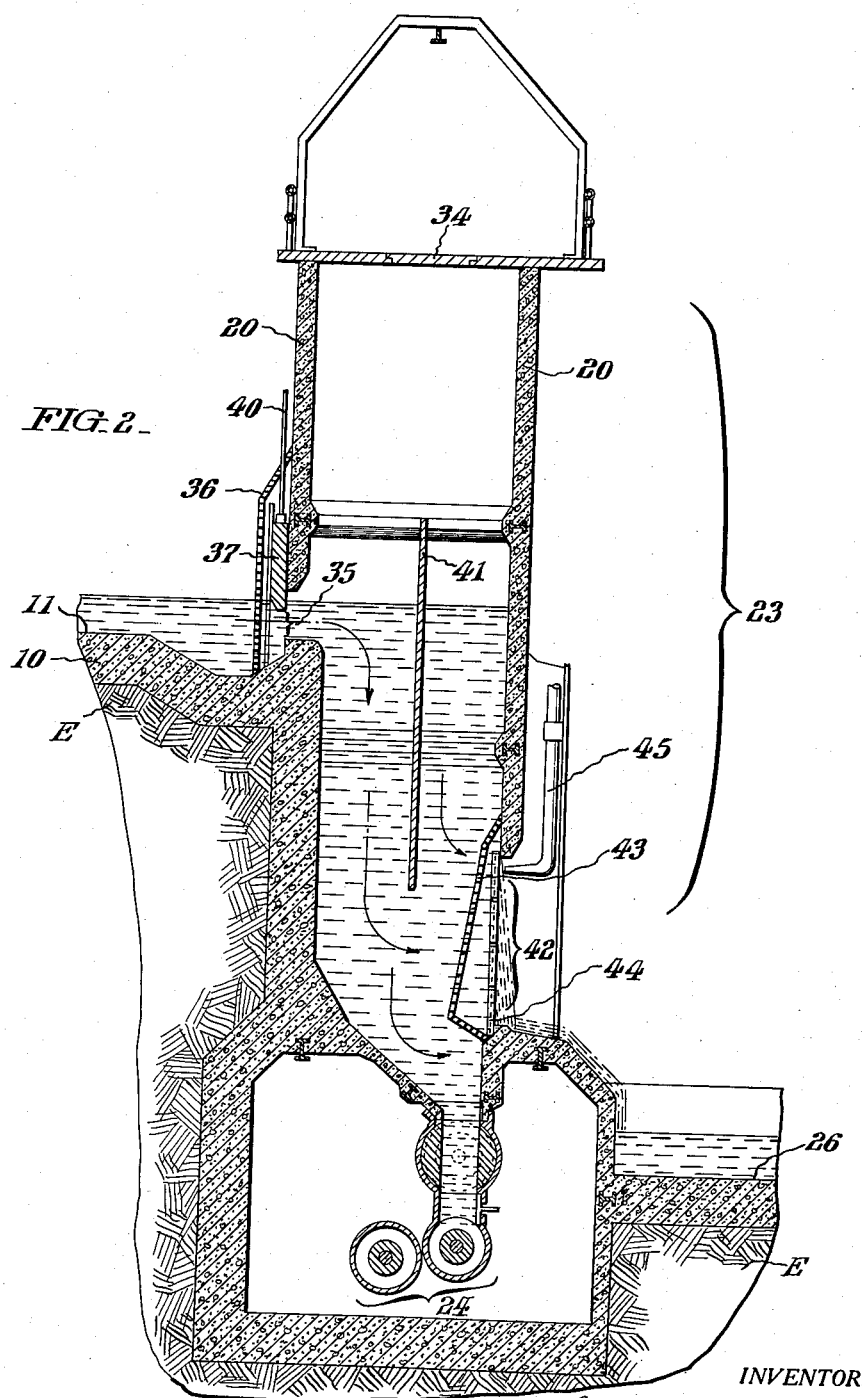

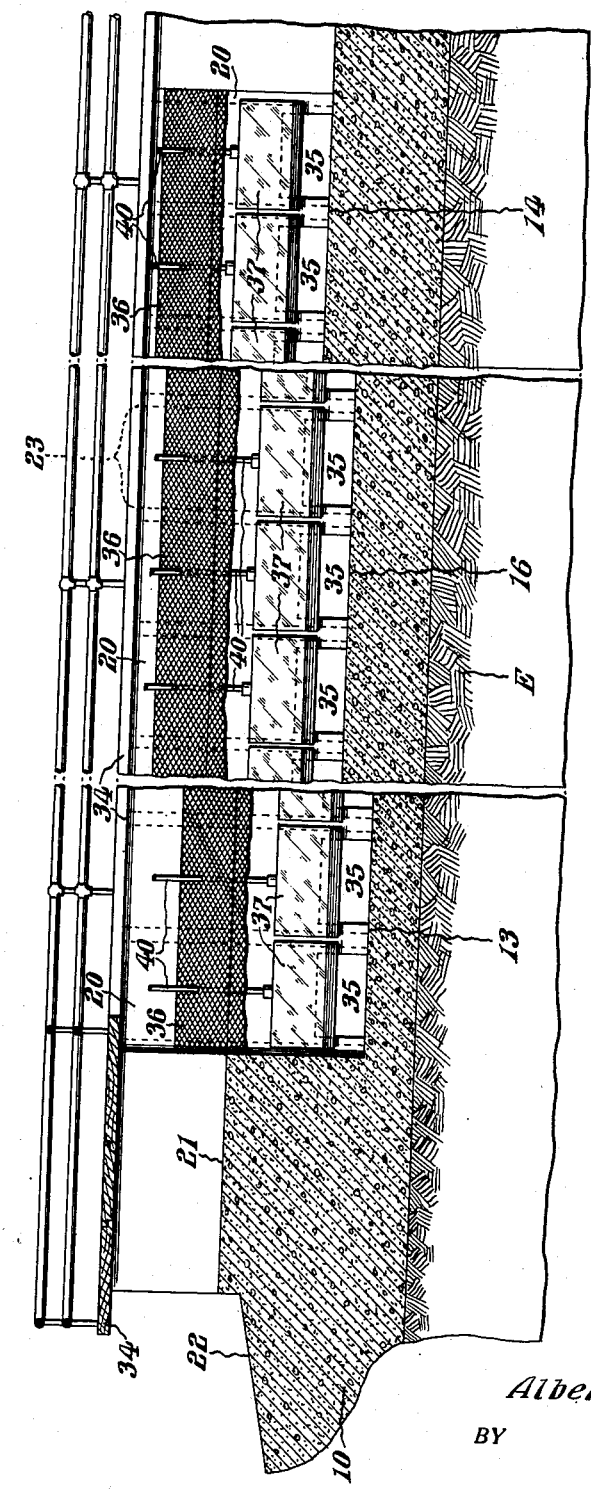
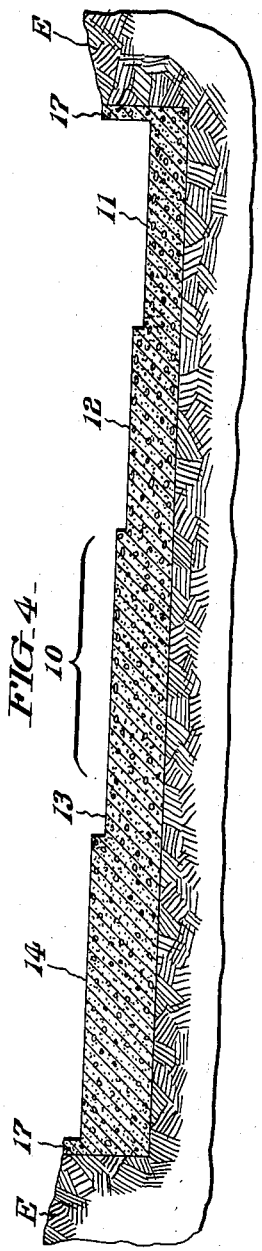

Patented Mar. 23, 1954

2,672,982

UNITED STATES PATENT OFFICE 2,672,982

SOLIDS RETENTION APPARATUS FOR STREAMS

Alben Warren Way, Philadelphia, Pa.

Application December 1, 1950, Serial No. 198,545

5 Claims. (Cl. 210—44)

This invention relates to solids retention apparatus and more particularly concerns a barrier constructed and arranged across the path of flow of a naturally flowing body of water such as a river, stream or the like. More particularly my invention relates to a barrier carrying a plurality of thickening devices which serve to remove finely divided solid particles from the flowing stream of water, discharging the clear processed water and retaining the solids in the form of a thickened concentrate of a consistency particularly suitable for reclamation.

For many years difficulty has been encountered in removing finely divided solid particles from following streams and the like. Such particles are frequently produced as by-products of coal mining, quarrying, and other industrial operations, and these finely divided particles are ordinarily carried by the water without appreciable tendency to settle even at points where the volumetric rate of flow of water is relatively low. Only after the stream discharges into a large basin or body of virtually still water will the fine particles settle, and the removal of the settled solids at these points presents a relatively expensive operation involving dredging or the like.

It is conventional in the art to separate suspended solids from flowing liquids by conducting the liquids into a so-called thickening tank wherein the liquid flow rate is very materially decreased, with the result that solid particles settle to the bottom of the tank for ultimate removal. However the operation of such conventional thickeners is dependent upon the capacity of the suspended particles to settle, and experience has demonstrated that finely divided silt particles will not settle at a sufficiently high rate to provide commercially practicable solids removal using this method, even when unusually large thickening tanks are employed.

It is accordingly an object of the invention to provide a practical and economical structure for removing finely divided solids from a flowing stream of water. Still another object of the invention is to provide a barrier adapted to be placed across the path of flow of a river or stream with capacity for clarifying the flowing water and separating the suspended solids therefrom, retaining the solids in the form of a thickened solids concentrate. A still further object is to provide a solids retention barrier for use in connection with a flowing body of water and having capacity to effect the aforementioned separation while minimizing the extent of upstream flooding. Other objects and advantages of the invention including the simplicity of construction and economy of operation of the solids retaining device, as well as the capacity of the structure for adaptation to wide fluctuations in the volume of fluid flow accommodated, will appear in further detail hereinafter.

In summary, the foregoing and other objects are attained by the provision of a barrier comprising a wall disposed across the path of flow of a body of water, at an angle to the direction of said flow, and a plurality of solids-thickening devices disposed along said barrier, said thickening devices having inlets at different levels for automatic accommodation of water at different volumetric rates of flow, down stream outlets for the water processed, and means for withdrawing the thickened solids concentrate.

Of the drawings:

Fig. 2 represents an enlarged sectional view taken as indicated by the lines and arrows II—II which appear in Fig. 1, the thickening device being shown as in actual operation for processing flowing water;

Fig. 3 represents an enlarged fragmentary sectional view of one wall of the barrier, taken as indicated by the lines and arrows III—III which appear in Fig. 1; and Fig. 4 represents an enlarged sectional view taken as indicated by the lines and arrows IV—IV which appear in Fig. 1.

Figure 1:
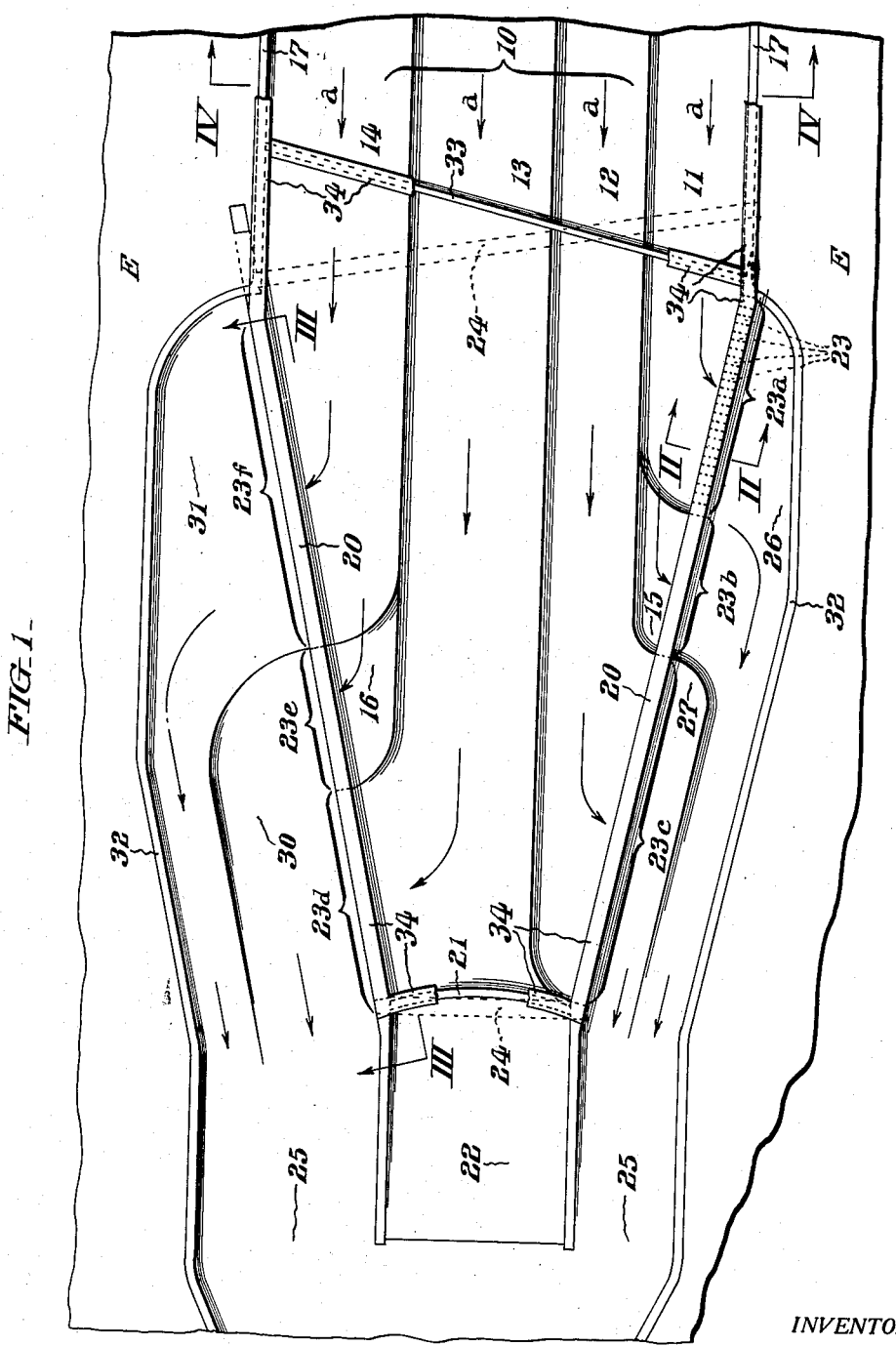
Fig. 1 represents a plan view of a barrier constructed in accordance with the invention.

It will be understood that the embodiment of the invention selected for illustration in the drawings constitutes one preferred embodiment thereof, and that the invention is also capable of assuming a wide variety of other forms not shown.

Having reference more particularly to Figs. 1 and 4 of the drawings, the concrete floor 10 is laid in the earth E along the path of flow of the natural stream, as indicated by the arrows (a). At its upstream end the floor 10 selected for illustration consists of four integral steps designated by the reference numbers 11, 12, 13, 14, and has two additional steps 15, 16 at its downstream end. Each such step has a floor or floor portion above which the natural stream may flow. At the downstream end of step 11 is the step 15, at a level intermediate the steps 11 and 12. The corresponding step 16, at a level intermediate the levels of steps 13 and 14, is disposed at the downstream end of step 14. A pair of side walls 17, upstanding from floor 10, define an inlet channel for the flowing stream of solids-laden water.

Disposed across the inlet channel is a barrier including the walls 20 which are disposed across the stream at an angle to the direction of fluid flow, and the weir 21 which has a concave cross section and is disposed across the central portion of the stream, connecting together the downstream ends of the walls 20 to complete the barrier. Downstream of the weir 21 is a sloped spillway 22 for the water overflowing the weir 21.

Disposed at regular intervals along the walls 20 are a plurality of individual thickening chambers comprehensively designated as 23, which serve to separate the suspended solids from the water and to retain these solids in the form of a thickened concentrate. As heretofore indicated, the fine particles do not settle to any appreciable extent on the steps 11–16 since the mixture consisting of water and fine particles flows continuously over said steps and is processed continuously by chambers 23.

The thickened concentrate retained in the chambers may be continuously or periodically removed from the thickening chambers when it has the desired solids content. This is accomplished by means of the screw conveyor 24 which carries the concentrate to the desired location for reclamation or for disposal. As indicated in Fig. 1, the screw conveyors 24 run lengthwise of and immediately beneath the walls 20, and also run across and beneath the stream and the concrete floor 10, both in the vicinity of the weir 21 at the downstream ends of walls 20, and also at the upstream ends of walls 20.

The clear water processed in the thickening chambers flows to the concrete downstream channel 25 along the floor including the sloped steps 26, 27, 30, 31, and is retained by the side walls 32 which define the outlet channel for the water processed.

The boom 33 which extends across the inlet of the barrier serves to exclude heavy objects such as floating logs and the like. A walkway 34 extends immediately above the boom 33 for convenience in effecting removal of such objects as they accumulate immediately upstream of the boom, and also extends immediately above the walls 20, the weir 21, and walls 17. The top surfaces of walls 20 are also in the form of walkways.

It will be appreciated that in the embodiment of the invention selected for illustration in the drawings, the floor 10 has six different floor portions disposed at six different levels, that the floor of step 11 is lowermost with the floors of steps 15, 12, 13, 16 and 14 following at successive higher levels in the order named. The inlet ports 35 of thickening chambers 23, see particularly Fig. 3 of the drawings, are similarly disposed at six different levels and the thickening chambers may thus be considered as divided into six different groups 23a–23f, three groups being arranged on each of the walls 20. The inlet ports 35 of the thickening chambers 23 of each group are all at substantially the same level and the inlet port levels for the different groups 23a–23f are arranged stepwise in accordance with the respective levels of the corresponding floor portions 11–16 of floor 10. Thus, the inlets shown in the drawings are equally spaced above the corresponding floor portions.

It will be apparent that during periods of minimum flow the level of flowing water will be relatively low, and the entire mass of water flowing will be carried by floor portion 11 of floor 10, and the associated group of thickening chambers 23a. During such periods the five other floor portions 12–16 will be dry and the associated thickening chambers 23b–23f will be out of operation. On the other hand, increased flow of water will result in increased water level at the barrier, and water not accommodated in the thickening chambers 23a associated with floor portion 11 will overflow to floor portion 15 and will be processed by the corresponding group of thickening chambers 23b. For still further increased water flow the other groups of thickeners 23c–23f will automatically come into operation in sequence without requiring attention or control.

Flow in excess of that accommodated by the six groups of thickeners will overflow the weir 21 thereby escaping treatment. However, this occurs only under extraordinary circumstances since the capacity of the barrier is designed for the anticipated peak flow of the particular river or stream involved.

The thickening chambers, which are preferably of the character shown and described in copending application Serial No. 624,144, now the patent to Way and Morton No. 2,603,354, granted July 15, 1952, or as indicated in Figs. 2 and 3 of the drawings, are preferably incorporated into and made a part of the barrier walls 20. Across the inlet 35 of each chamber is a coarse screen 36 which serves to exclude large objects from the thickening chamber. The inlet is also provided with a gate 37 having an attached control rod 40. The action of the control rod 40 is governed by conventional gate control means, not shown. Suspended within the body of the thickening chamber is a transverse vertical baffle 41 which serves to prevent relatively coarse particles from damaging screen 43, further referred to herein, and also assists in swirling the liquid in the vicinity of the bottom of the thickening chamber, thereby minimizing the settlement of solids. It is to be particularly observed that the solid particles suspended in naturally flowing streams are very small and may approach a minimum dimension of about 5 microns. Accordingly, little or no settling takes place in the thickening chamber.

Below the inlet port 35 is the outlet port 42 of the thickening chamber. The coarse screen 43 is disposed across the outlet port 42. A fine screen 44, capable of retaining particles having a dimension of about 5 microns or above, is disposed across the outlet port 42. Thus the water processed in the thickening chamber flows outwardly through outlet port 42 and on to the concrete spillway 26 for resumption of flow downstream.

The backwash nozzle 45 is connected to a source of water under pressure (not shown), and serves to dislodge solid particles from the fine screen 44 and to promote agitation of the concentrate retained in the thickening chamber 23. The construction and operation of highly advantageous backwash means appears in detail in my aforementioned copending application, and is not further elaborated upon herein.

It is an important feature of this invention that the angled barrier is located in the river or stream at a point providing relatively steep slope or sudden drop, whereby the tendency of the water to flood upstream land is minimized. To this end the drop of the bed of the flowing body of water, near and downstream of the thickeners, is preferably equal to or greater than the vertical distance from inlet gates to fine screens, and sufficient to allow free flow for the discharge from the screens. The angled barrier construction of this invention is of particular advantage in that a maximum filter area is exposed and upstream flooding is held to a minimum or entirely prevented, and particularly economical and simple side wall construction is made possible. Moreover the disposition of side walls 20 at acute angles to the path of fluid flow, forming a substantially V-shaped barrier, together with provision of the stepped floor structure as previously described, minimizes the requisite wall thickness for the barrier structure and otherwise greatly simplifies the barrier construction.

In other words, this construction or plant will accept the entire flow of the stream, whether of minimum or flood volume, retaining floating solids from same in sizes down to about 5 microns, thickening these retained solids to a constant predetermined degree (ratio of solids to water)

ready for further processing or for convenient disposal, and discharging cleared water back into the stream bed with volume or rate of flow little changed from the stream flow originally received.

While I have described my invention with reference to one specific embodiment thereof, it will be apparent to those skilled in the art that various changes, such as reversals of parts, etc., may be made in the form of the device, that equivalent elements may be substituted for those specifically illustrated in the drawings, and that certain features of the invention may be used to advantage independently of the use of other features, all within the scope and spirit of the invention as defined in the appended claims.

Having thus described my invention, I claim:

1. A structure for separating finely divided solids continuously from naturally flowing water, said particles being as small as 5 microns across, comprising a floor arranged in the form of a series of floor portions extending at different levels across the path of the flowing mixture of particles and water, a wall extending upwardly from said floor and also extending across the path of the flowing particles and water, and a plurality of solids-thickening devices disposed along said wall, each of said thickening devices having an inlet, said inlets being arranged at different levels corresponding to the different levels of the floor for automatic accommodation of said particles and water flowing at different volumetric rates on different portions of the floor, said inlets all being disposed at substantially the same distance above the corresponding floor portion, and disposed to cooperate with the floor portions to define the path of flow of water at corresponding levels.

2. Apparatus for recovering finely divided solids in the form of a thickened concentrate from a rapidly flowing stream of water, comprising a structure including a pair of walls disposed across the flowing water at a point where the stream of water has a substantial drop downstream of said structure, a plurality of solids-thickening devices each having an inlet, said inlets being disposed along said walls at different levels, all said levels being below the tops of said walls, screens for retaining solids in said solids-thickening devices, downstream outlets for the water processed, means for withdrawing the thickened concentrate from the thickeners, and a plurality of floors under the flowing water upstream of said walls, said floors being arranged at different levels corresponding to the levels of the inlets, said floors and inlets cooperating to define the path of flow of water at different levels.

3. A structure for separating finely divided solids continuously from naturally flowing water, comprising a plurality of floors extending at different levels across the path of the flowing water, at least some of said floors being immediately adjacent and in fluid communication with one another and free of any dam or barrier therebetween, a wall extending upwardly from said floors and also extending across the path of the flowing water at a point where the stream of water drops downstream of said structure, the top of said wall being above the levels of all said floors, and a plurality of separate solids-thickening devices disposed along said wall, each of said thickening devices having an inlet, said inlets being aligned with one another and arranged stepwise in groups along said wall at levels corresponding to the levels of the floors the inlets being spaced equally above the corresponding floors, said inlets and floors cooperating to define the path of flow of water at corresponding levels.

4. A structure for separating finely divided solids from naturally flowing water, comprising a plurality of floors extending at different levels across the path of the flowing water, a wall extending upwardly from said floors and across the path of the flowing water, confining means for confining the sides of the stream upstream of said wall, a plurality of individual thickening chambers arranged side by side in said wall, screens in said chambers for retaining finely divided solids, means for withdrawing the retained solids from the chambers, downstream outlets in said chambers for the water processed, each chamber having an inlet opening, the chamber inlets being arranged stepwise in groups on said wall, said confining means extending above said chamber inlets, the arrangement of said groups of chamber inlets corresponding to the arrangement of the floors, said inlets and floors being disposed to cooperate to define a path of flow of water at corresponding levels, and said stream having a downstream drop equal to or greater than the vertical distance between the uppermost chamber inlet and the corresponding downstream chamber outlet, said drop being effective to allow free flow for the water discharged from the screens.

5. A structure for recovering finely divided solids in the form of a thickened concentrate from naturally flowing water comprising a wall disposed across the path of flow of said water at an angle to the direction of said flow, a floor upstream of said wall having a plurality of floor portions arranged at different levels, each of said floor portions accommodating the flow of said water at a determined volumetric rate of flow, a plurality of solids-thickening chambers disposed along said wall, each of said chambers having an inlet, said inlets being arranged at different levels corresponding to the levels of said floor portions and at substantially equal distances respectively above the levels of said floor portions, said inlets being disposed to cooperate with said floor portions to define the path of flow of water at said corresponding levels, said solids-thickening chambers having downstream outlets for the water processed, and means for withdrawing the thickened concentrate, said chambers having capacity to process the water at a rate sufficient to require the incoming water upstream of said wall to flow faster than the rate at which substantial settling of fine solids takes place on said floor.

ALBEN WARREN WAY.

References Cited in the file of this patent

UNITED STATES PATENTS

| Number | Name | Date |
|---|---|---|
| 235,967 | Sewell | Dec. 28, 1880 |
| 815,722 | Lydon | Mar. 20, 1906 |
| 1,376,889 | Kirby | May 3, 1921 |
| 1,431,367 | Buchi | Oct. 10, 1922 |
| 2,025,722 | Camp | Dec. 31, 1925 |
| 2,586,447 | Way | Feb. 19, 1952 |

FOREIGN PATENTS

| Number | Country | Date |
|---|---|---|
| 42,141 | Switzerland | Oct. 26, 1907 |
| 92,154 | Austria | Apr. 10, 1923 |
| 103,670 | Great Britain | Jan. 24, 1918 |